(12) United States Patent
Chen et al.

(10) Patent No.: US 8,482,596 B2
(45) Date of Patent: Jul. 9, 2013

(54) IMAGE ADJUSTING APPARATUS AND ASSOCIATED METHOD

(75) Inventors: Jiunn-Kuang Chen, Hsinchu Hsien (TW); Chieh-Huang Tu, Hsinchu Hsien (TW); Chih-Liang Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 640 days.

(21) Appl. No.: 12/704,407

(22) Filed: Feb. 11, 2010

(65) Prior Publication Data

US 2010/0207939 A1 Aug. 19, 2010

Related U.S. Application Data

(60) Provisional application No. 61/152,275, filed on Feb. 13, 2009.

(51) Int. Cl.
*H04N 7/12* (2006.01)

(52) U.S. Cl.
USPC .................. 348/42; 348/43; 348/46; 348/52; 375/240.01

(58) Field of Classification Search
USPC ....................... 375/240.01; 348/42, 43, 46, 52
See application file for complete search history.

(56) References Cited

U.S. PATENT DOCUMENTS

| | | | | |
|---|---|---|---|---|
| 4,212,072 A | * | 7/1980 | Huelsman et al. | 348/163 |
| 5,710,592 A | * | 1/1998 | Oh | 348/56 |
| 6,160,590 A | * | 12/2000 | Shimizu et al. | 348/581 |
| 6,593,967 B1 | * | 7/2003 | McGarvey et al. | 348/312 |
| 6,778,170 B1 | * | 8/2004 | Shu et al. | 345/213 |
| 2002/0196366 A1 | * | 12/2002 | Cahill, III | 348/537 |
| 2006/0026450 A1 | * | 2/2006 | Bounitch | 713/600 |
| 2010/0289883 A1 | * | 11/2010 | Goris et al. | 348/56 |

* cited by examiner

*Primary Examiner* — Sath V Perungavoor
*Assistant Examiner* — Geepy Pe
(74) *Attorney, Agent, or Firm* — WPAT, PC; Justin King

(57) ABSTRACT

An image adjusting method for extending vertical blanking intervals of an image signal is provided. Using the image adjusting method, an adjusted image signal is synchronized with an image signal before the adjustment to prevent image delay. The image adjusting method comprises providing a first image signal having a first data enable signal, wherein the first data enable signal has a first data enable duration; and generating a second data enable signal having a second data enable duration. The first and second data enable durations correspond to a same image frame of an image signal, and the second data enable duration substantially overlaps the first data enable duration.

19 Claims, 7 Drawing Sheets

IMAGE ADJUSTING APPARATUS AND ASSOCIATED METHOD

CROSS REFERENCE TO RELATED PATENT APPLICATION

This patent application is based on a U.S. provisional patent application No. 61/152,275 filed on Feb. 13, 2009.

FIELD OF THE INVENTION

The present invention relates to an image adjusting apparatus and an associated method, and more particularly, to an image adjusting apparatus and an associated method for extending vertical blanking intervals of an image signal.

BACKGROUND OF THE INVENTION

In the three-dimensional (3D) stereo display technology, the 3D stereo display associated with a time sequence is considered as being quite mature. That is, images of the left eye and the right eye are alternately displayed on the basis of a time sequence so that the eyes of a viewer perceive the left-eye images and the right-eye images alternately. More particularly, the left eye of the viewer only perceives the left-eye images and the right eye of the viewer only perceives the right-eye images. For example, a pair of stereo glasses, having a left-eye shutter and a right-eye shutter, associated with a display capable of alternately displaying the left-eye images and the right-eye images, can provide 3D stereo images to the viewer.

FIG. 1 shows a schematic diagram of timing control of stereo images displayed by an LCD display and a pair of stereo glasses of the prior art. As shown, the LCD display alternately displays left-eye images and right-eye images. Since the LCD display is a hold-type display, each of pixels of the LCD display displays current pixel data continuously before being updated. Therefore, as shown in the diagram, during an interval in which a display image of the LCD display is updated with a left-eye image, the display image (e.g., a display image of a time point Ta illustrated at the bottom of FIG. 1) of the LCD display actually contains not only an updated left-eye image, but also a right-eye image that is not yet updated. Upon entering a vertical blanking interval, the display image of the LCD display is completely updated with the updated left-eye image (e.g., a display image of a time point Tb illustrated at the bottom of FIG. 1). Likewise, during an interval in which the display image of the LCD display is updated with a right-eye image, the display image (e.g., a display image of a time point Tc illustrated at the bottom of FIG. 1) of the LCD display actually contains not only an updated right-eye image, but also a left-eye image that is not yet updated. Upon entering a vertical blanking interval, the display image of the LCD display is completely updated with the updated right-eye image (e.g., a display image of a time point Td illustrated at the bottom of FIG. 1).

In order to avoid crosstalk, the pair of stereo glasses is only correspondingly switched to an open state during vertical blanking intervals. More specifically, the left-eye shutter of the pair of stereo glasses is opened during the vertical blanking intervals after the left-eye images have been updated, and when the current display image begins to be updated with the right-eye images, both of the left-eye and right-eye shutters of the stereo glasses are closed. Similarly, the left-eye shutter of the stereo glasses is opened during the vertical blanking intervals after the right-eye images have been updated, and when the current display image begins to be updated with the right-eye images, both of the left-eye and right-eye shutters of the stereo glasses are closed.

It is apparent from the foregoing description that, when viewing stereo images with a pair of stereo glasses, the images can only be perceived during vertical blanking intervals, which are rather short in a common image signal. Under such circumstances, since intervals that a viewer sees the images are extremely short, not only the viewer feels the images have inadequate brightness, but also an intended stereo effect may not be achieved as a result of left and right images of the stereo images appear as separate images for that the left and right images fail to form visual persistence in the viewer's brain. In order to provide a solution to above issue, the vertical blanking intervals need be extended to prolong intervals in which the stereo glasses are switched to an open state. In the prior art, to increase the vertical blanking interval, pixel data of an image signal is first written into a temporary memory, and is then read out from the memory according to a relatively faster read clock to generate an adjusted image signal. Through such approach, each data enable duration of a vertical data enable signal is reduced from reading the pixel data with the relatively faster reading clock, while a frame cycle of the adjusted image signal remains unchanged, so that the vertical blanking interval is extended as desired.

FIG. 2 shows a timing diagram of a vertical data enable signal of an image signal, before and after extending the vertical blanking interval with the prior art. A vertical data enable signal $VDE_1$ in the unadjusted image signal includes a plurality of vertical data enable durations, each of which indicates a position of pixel data corresponding to an image frame in the unadjusted image signal. A vertical data enable signal $VDE_2$ in the adjusted image signal similarly includes a plurality of vertical data enable durations, each of which indicates a position of pixel data corresponding to an image frame in the adjusted image signal. As shown in FIG. 2, a rising edge of a vertical data enable duration $VDE_{2\_n-1}$ of an $(n-1)^{th}$ frame of the vertical data enable signal $VDE_2$ in the adjusted image signal is aligned with a rising edge of a vertical data enable duration $VDE_{1\_n}$ of an $n^{th}$ frame of the vertical data enable signal $VDE_1$ in the unadjusted image signal—it means the adjusted image signal falls one frame cycle behind the unadjusted image signal. Thus, the prior approach for increasing the vertical blanking intervals leads to delaying an adjusted image signal by at least one frame cycle compared to an unadjusted image signal, such that the delay in the adjusted image signal leads to in signal delay in certain applications. For example, in an application of television/computer game display, score performance of the user may be undesirably affected due to message hold-up from the delay of the adjusted image signal.

SUMMARY OF THE INVENTION

One of the objectives of the invention is to provide an image adjusting apparatus and an associated method for extending vertical blanking intervals of an input image signal, so as to synchronize an adjusted image signal with an unadjusted image signal to prevent image delay.

To achieve the foregoing objective, an image adjusting method according to the invention comprises: providing a first image signal having a first data enable signal, wherein the first data enable signal has a first data enable duration; and generating a second data enable signal including a second data enable duration. The first and second data enable durations correspond to a same image frame of the first image signal, and the second data enable duration substantially overlaps the first data enable duration.

In the image adjusting method according to one embodiment of the invention, the second data enable duration is smaller than the first data enable duration, and a start point of the second data enable duration falls behind a start point of the first data enable duration.

An image adjusting apparatus is further provided according to the invention to extend vertical blanking intervals of a first image signal. The first image signal comprises a first data enable signal and pixel data of an image frame, and the first data enable signal includes a first data enable duration. The image adjusting apparatus comprises a memory for storing the pixel data of the first image signal, and a data enable signal generator for generating a second data enable signal for controlling the timing which the memory outputs the pixel data. The second data enable signal includes a second data enable duration. The first and second data enable durations correspond to the image frame of the first image signal, and the second data enable duration substantially overlaps the first data enable duration.

In the image adjusting apparatus according to one embodiment of the invention, the data enable signal generator generates the second data enable signal according to a predetermined time, a frame cycle and a read clock.

According to another embodiment of the invention, the image adjusting apparatus further comprises: a detector, for detecting a first reference point of the first data enable signal to generate a first detection signal, and detecting a second reference point of the second data enable signal to generate a second detection signal; an adjustment value generator, for generating an adjustment value according to the first and second detection signals; and a clock generator, for generating a read clock and adjusting the read clock according to the adjustment value.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
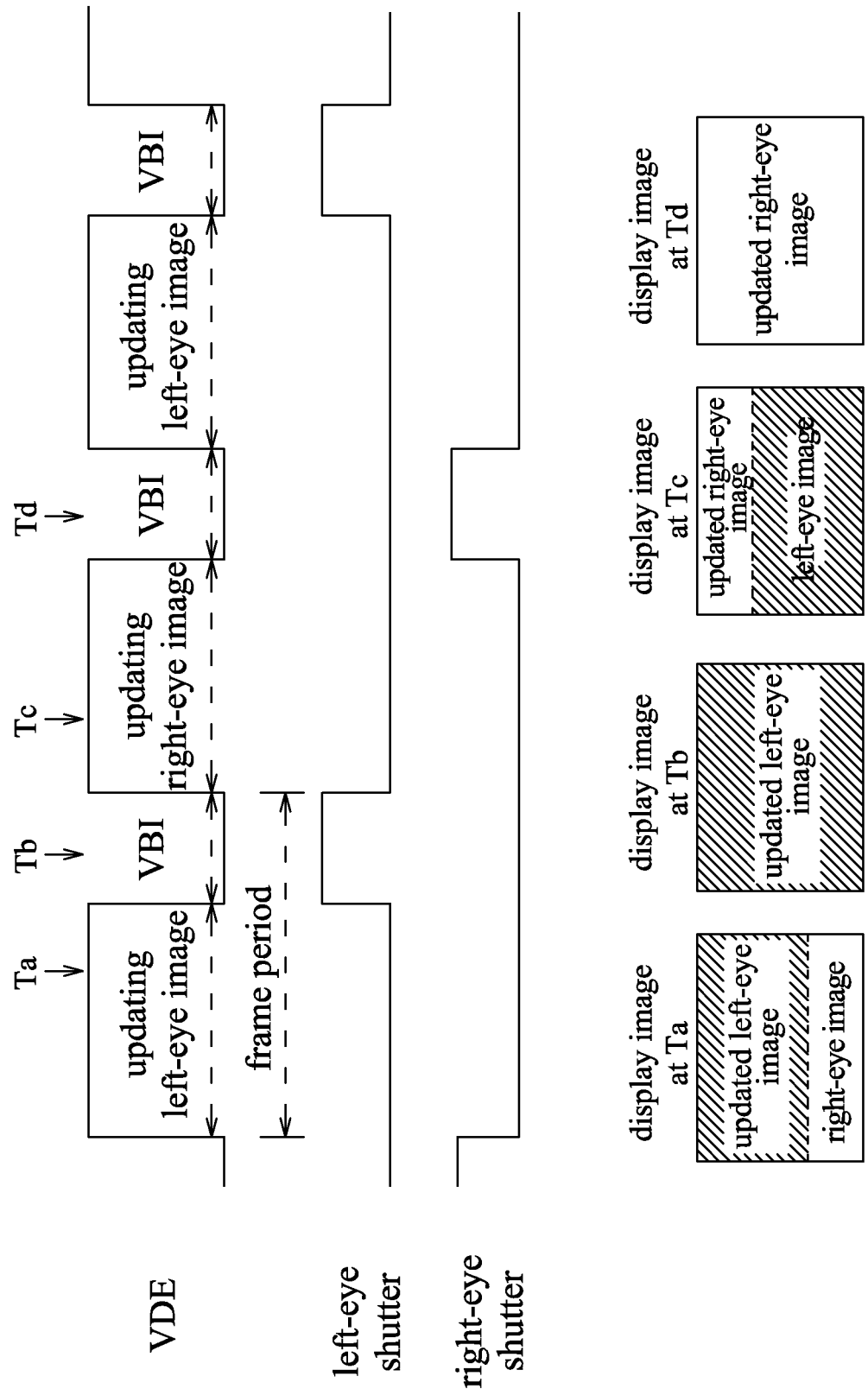
FIG. 1 is a schematic diagram of timing control of stereo images displayed by an LCD display and a pair of stereo glasses of the prior art.
Figure 2:
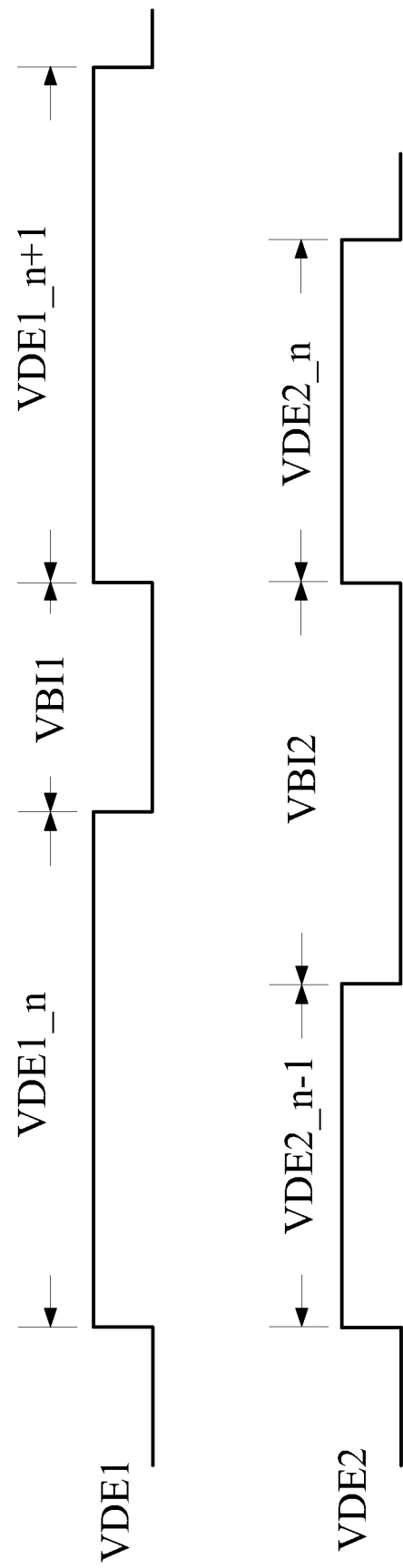
FIG. 2 is a timing diagram of vertical data enable signals of an image signal, before and after extending the vertical blanking interval with the prior art.
Figure 3:
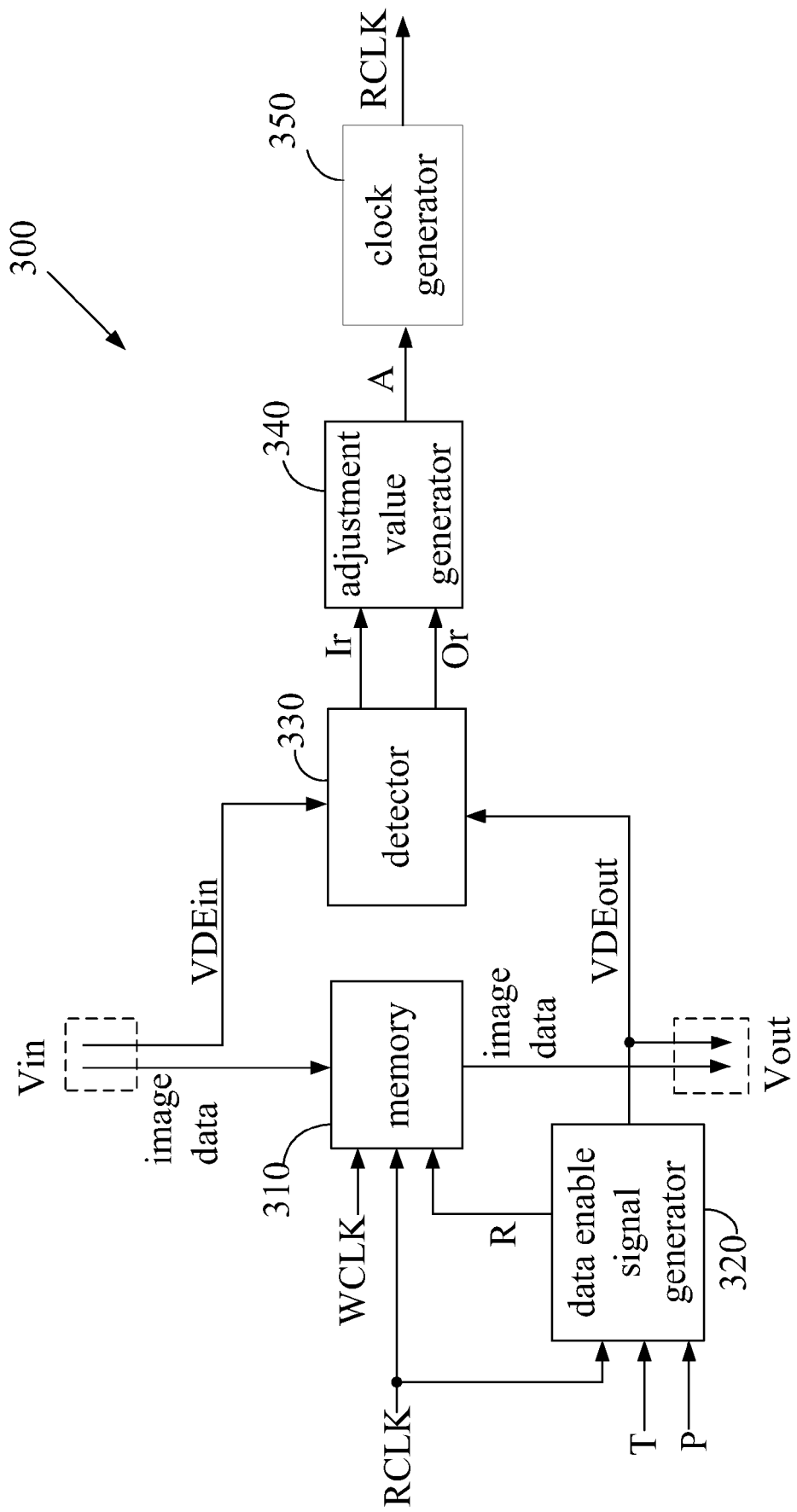
FIG. 3 is a block diagram of an image adjusting apparatus according to one embodiment of the invention.

The present invention provides an image adjusting apparatus for extending a vertical blanking interval of an image signal, so as to substantially synchronize an adjusted image signal with an unadjusted image signal to prevent image delay. With reference to FIG. 3 showing a block diagram of an image adjusting apparatus according to one embodiment of the invention, an image adjusting apparatus 300 comprises a memory 310, a data enable signal generator 320, a detector 330, an adjustment value generator 340, and a clock generator 350. The image adjusting apparatus 300 is for adjusting vertical blanking intervals of an input image signal Vin to output an output image signal Vout. The input image signal Vin comprises a vertical data enable signal VDEin and image data, and the vertical data enable signal VDEin includes a plurality of data enable durations, each of which indicates a position of pixel data corresponding to a frame in the image data. The output image signal Vout comprises a vertical data enable signal VDEout and image data. The memory 310 is for temporarily storing pixel data of the input image signal Vin. In practice, pixel data corresponding to the frames of the input image data Vin is sequentially written into the memory 310 according to the data enable signal VDEin and a write clock WCLK. More specifically, pixel data corresponding to each frame of the input image signal Vin is located within a data enable duration of the vertical data enable signal VDEin, and the corresponding pixel data, under the control of the write clock WCLK, is written into the memory 310 during the data enable duration.

Figure 4:
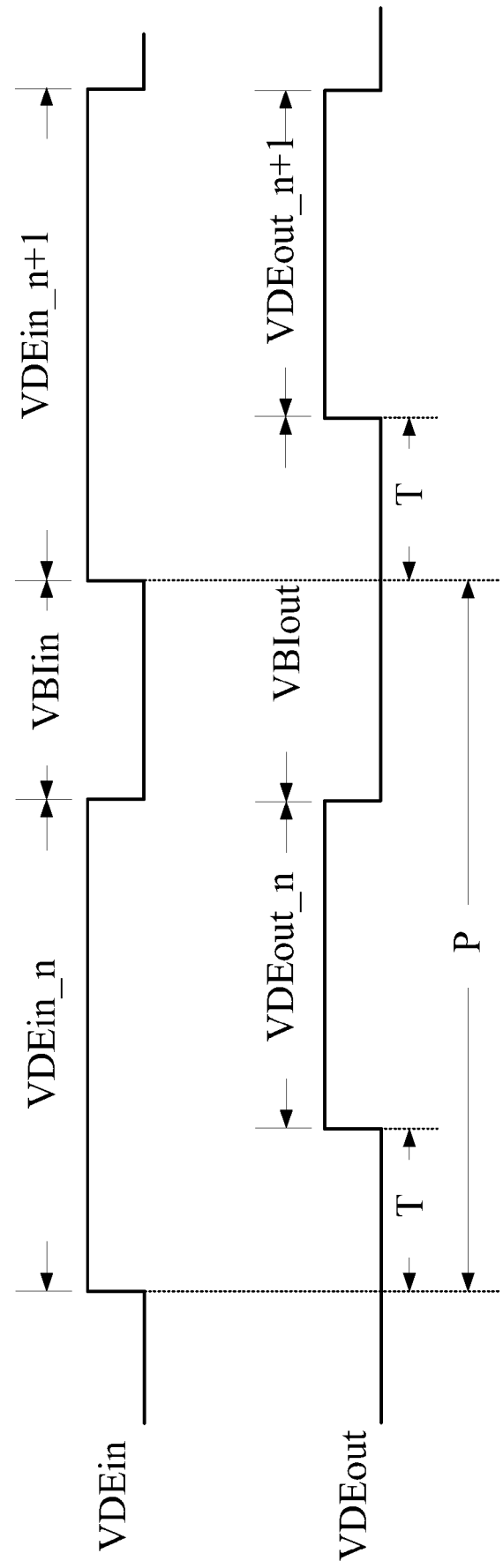
FIG. 4 is a timing diagram of vertical data enable signals of an image signal, before and after extending the vertical blanking interval with an image adjusting apparatus according to the invention.

The data enable signal generator 320 is for generating a vertical data enable signal VDEout, and for controlling the timing which the memory 310 outputs the stored pixel data. FIG. 4 shows a timing diagram of vertical data enable signals of an image signal, before and after extending the vertical blanking interval with an image adjusting apparatus according to the invention. In FIG. 4, T represents an increased period in the vertical blanking interval, and a data enable duration in the vertical data enable signal VDEin added to a vertical blanking interval duration VBIin is a frame cycle of the input image signal Vin. Similarly, a data enable duration in the vertical data enable signal VDEout added to a vertical blanking interval duration VBIout is a frame cycle of the output image signal Vout. In this embodiment, the frame cycle of the input image signal equals to that of the output image signal Vout. As shown in FIG. 4, the vertical data enable signal VDEout generated by the data enable signal generator 320 includes a vertical data enable duration VDEout_n corresponding to an $n^{th}$ frame, and the vertical data enable duration VDEout_n corresponding to the $n^{th}$ frame is largely located within a vertical data enable duration VDEin_n corresponding to the $n^{th}$ frame, with the vertical data enable duration VDEout_n being smaller than the vertical data enable duration VDEin_n.

The data enable signal generator 320 generates a read signal R to the memory 310 to control when the memory 310 outputs the pixel data of the frames, such that the memory 310 respectively outputs the pixel data corresponding to the frames during corresponding vertical data enable durations of the vertical data enable signal VDEout. For example, the memory 310 outputs the pixel data corresponding to the $n^{th}$ frame during the vertical data enable duration VDEout_n, and outputs the pixel data corresponding to the $(n+1)^{th}$ frame during the vertical data enable duration VDEout_n+1. In one embodiment, the vertical data enable signal VDEout generated by the data enable signal generator 320 can serve as the read signal R, and thus the pixel data corresponding to the frames outputted by the memory 310 together with the vertical data enable signal VDEout form the output image signal Vout.

In one embodiment, the data enable signal generator 320 can comprise a counter. When the image adjusting apparatus 300 starts receiving the input image signal Vin to be adjusted, the counter in the data enable signal generator 320 starts counting according to the read clock RCLK. After the period T, the data enable signal generator 320 generates a data enable duration (i.e., a high level period) in the vertical data enable signal VDEout. After generating the data enable duration, the counter keeps counting till reaching an end of a frame cycle P, and then a count of the counter is reset to start counting for another frame cycle P. Therefore, the vertical data enable signal VDEout generated by the data enable signal generator 320 includes cyclic data enable durations, and between every two adjacent data enable durations is a vertical blanking interval VBIout. During each data enable duration, the data enable signal generator 320 triggers the memory 310 to output the pixel data by the read signal R. Since the read signal R is for controlling the timing which the memory 310 outputs pixel data of a frame, the read signal R may be utilized to control opening and shutting of shutters of stereo glasses when the image adjusting apparatus according to the invention is applied for processing a 3D stereo image.

Again with reference to FIG. 4, before the pixel data of the $n^{th}$ frame of the input image Vin is completely written into the memory 310, the image adjusting apparatus 300 starts to output the pixel data of the $n^{th}$ frame according to a relatively faster clock, and makes a time point at which the memory 310 finishes outputting the pixel data of the $n^{th}$ frame approximate or even equal to a time point at which the pixel data of the $n^{th}$ frame is completely written into the memory 310, thereby achieving the objective of extending vertical blanking intervals without resulting in image delay.

How the image adjusting apparatus according to the invention adjusts a frequency of the read clock and makes the output image signal Vout and the input image signal Vin have the same frame cycles shall be described below. To ensure the frame cycle of the output image signal Vout to be the same as that of the input image signal Vin, the image adjusting apparatus 300 detects with the detector 330 a first reference point of the input image signal Vin and a second reference point of the output image signal Vout, and adjusts the frequency of the read clock according to the detection results. More specifically, the detector 330 detects a time point of the first reference point of the input image signal Vin to generate a first detection signal Ir. For example, the detector 330 is an edge detector, and the first reference point is a falling edge of the vertical data enable signal VDEin of the input image signal Vin, such that the first detection result Ir is generated whenever the detector 330 detects a falling edge in the vertical data enable signal VDEin. Similarly, the detector 330 also detects a time point of the second reference point of the output image signal Vout. For example, the second reference point is a falling edge of the vertical data enable signal VDEout of the output image signal, such that the second detection signal Or is generated whenever the detector 330 detects a falling edge in the vertical data enable signal VDEout.

Figure 5:
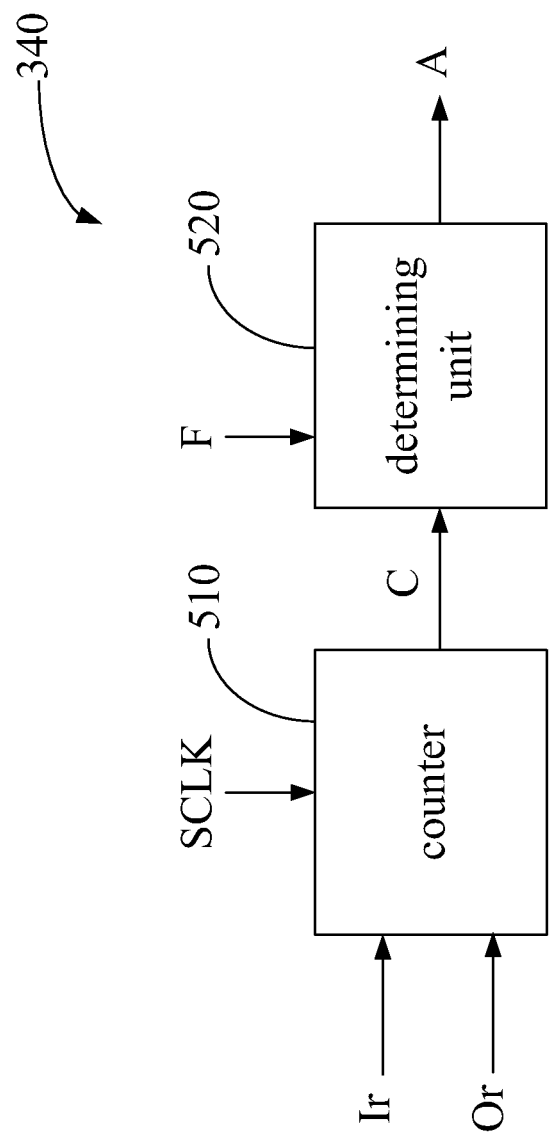
FIG. 5 is a functional block diagram of an adjustment value generator in the image adjusting apparatus according to an embodiment of the invention.

After receiving the first detection signal Ir and the second detection signal Or, the adjustment value generator 340 performs analysis to generate an appropriate adjustment value A for adjusting the frequency of the read clock RCLK. FIG. 5 shows a functional block diagram of an adjustment value generator 340 in the image adjusting apparatus 300 according to an embodiment of the invention. The adjustment value generator 340 comprises a counter 510 and a determining unit 520. Upon receiving the first detection signal Tr, the counter 510 starts counting according to a reference clock SCLK, e.g., a system clock of the image adjusting apparatus 300.

Upon receiving the second detection signal Or, the counter outputs a count value C to the determining unit 520, and resets the count value. The determining unit 520 determines based on the count value C whether the frequency of the read clock RCLK is too high or too low, so as to generate a corresponding adjustment value A. Since an appropriate frequency range of the read clock RCLK may be calculated in advance according to a desired extended period (the period T) for the vertical blanking interval, the frequency of the write clock WCLK, and the frame cycle of the input image signal, thus, the read clock RCLK generated by the clock generator 350 is supposedly quite close to a target value. Hence, the frequency of the read clock RCLK may be determined as being too high or too low with an aid of a reference value F, which may be a half of the frame cycle, for example.

Figure 6:
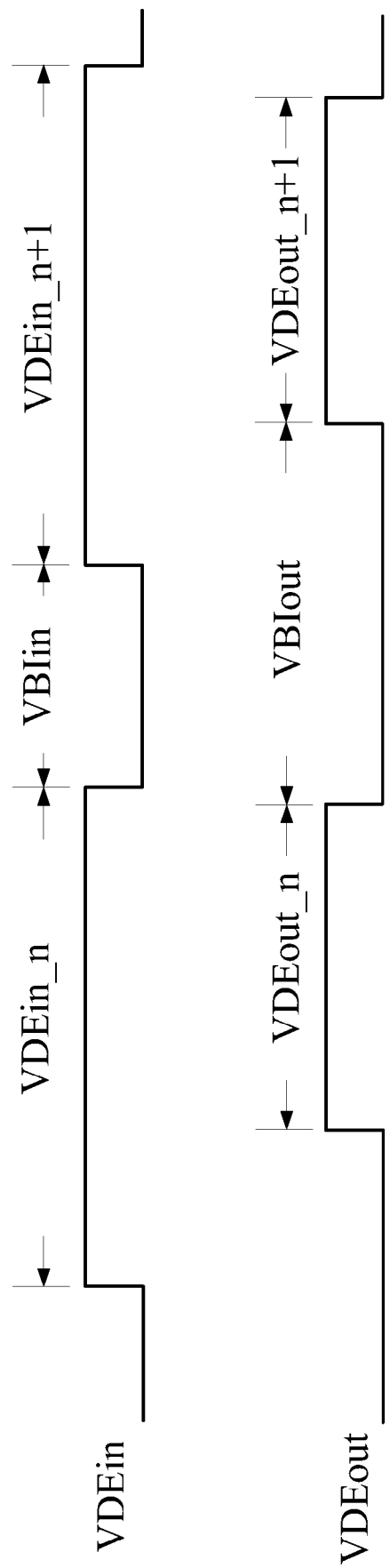
FIG. 6 is a timing diagram of a vertical data enable signal of an input/output signal when the read clock is too fast.

FIG. 6 shows a timing diagram of vertical data enable signals of input and output signals when the frequency of the read clock RCLK is too high, i.e., the read clock RCLK is too fast. When the read clock RCLK is too fast, a time point at which pixel data of a frame is completely read out from the memory 310 is earlier than a time point at which the pixel data of the frame is completely written into the memory, such that the count value C generated by the counter 510 exceeds the reference value F. FIG. 6 illustrates a situation that pixel data to be read out from the memory 310 is not yet written into the memory 310. Thus, when the counter value C exceeds the reference value F, the determining unit 520 determines that the frequency of the current read clock RCLK is too high, and accordingly generates an appropriate adjustment value A for reducing the frequency of the read clock RCLK. In contrast, when the counter value C is smaller than the reference value F, the determining unit 520 determines that the frequency of the current read clock RCLK is too low, and accordingly generates an appropriate adjustment value A for increasing the frequency of the read clock RCLK. It is to be noted that the above example is merely for illustrating the invention but not to limit the invention within. In another embodiment, the counter starts counting upon receiving the second detection signal Or, and stops counting and outputs a count value C to the determining unit 520 upon receiving the first detection signal Ir. Accordingly, the determining unit 520 generates an adjustment value A based on the count value C and an appropriate reference value F.

Figure 7:
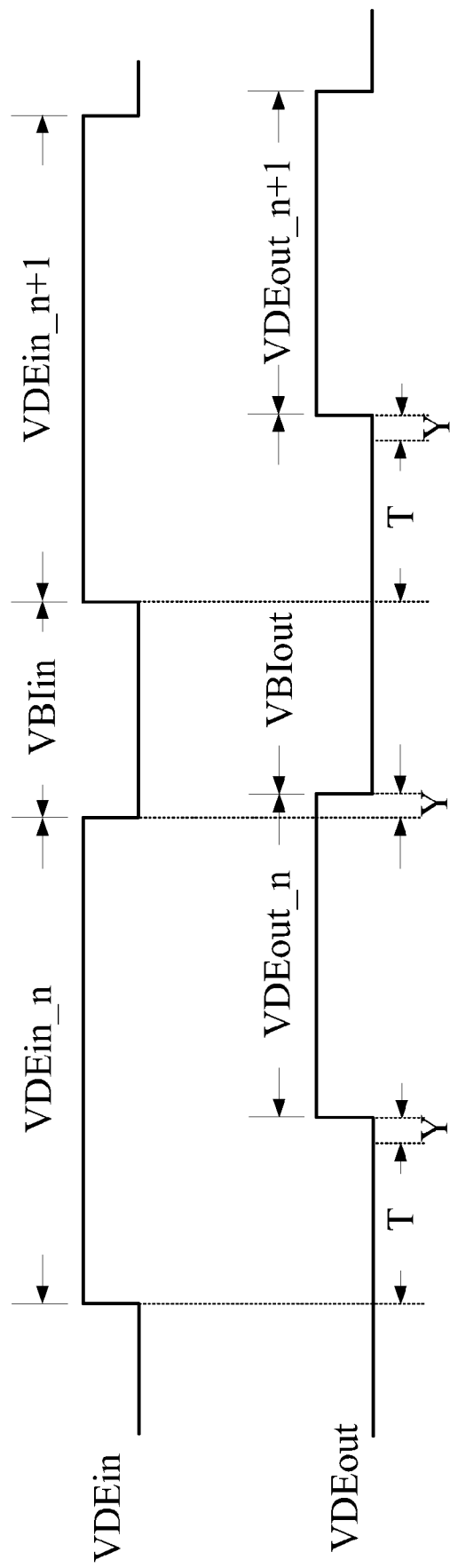
FIG. 7 is a timing diagram of vertical data enable signals of input and output image signal according to another embodiment of the invention.

FIG. 7 shows a timing diagram of vertical data enable signals of input and output image signals according to another embodiment of the invention. In FIG. 7, between the vertical data enable signal VDEin and the vertical data enable signal VDEout is a predetermined small delay period Y for preventing a situation that data to be read is not yet written into the memory 310 when the read clock is too fast. Under such conditions, the delay time Y is also taken into considerations when the adjustment value generator 340 generates the adjustment value A. For example, when the determining unit 520 determines whether the frequency of the read clock RCLK is too high or too low to generate the adjustment value A, the delay time Y is subtracted from the count value C, and a difference between the two is then compared with the reference value F to further generate an appropriate adjustment value A according to the comparison result.

The clock generator 350 is for generating the read clock RCLK and adjusting the frequency of the read clock RCLK according to the adjustment value A. In practice, the clock generator 350 comprises a phase locked loop, for example. When the clock generator 350 first starts to generate the read clock RCLK, the frequency range of the read clock RCLK may be calculated in advance according to the desired extended period (the period T) for the vertical blanking interval, the frequency of the write clock WCLK and the frame cycle of the input image signal Vin. More specifically, since the input image signal Vin and the output image signal Vout have the same frame cycle, and the number of pixel data of each frame of the input image signal Vin is also the same as that of the output image signal Vout, the frame cycle of the input image signal Vin and the output image signal Vout is represented by Equation (1):

$$VBIin+M/I=VBIin+T+M/O \qquad \text{Equation (1)}$$

Wherein, VBIin is the vertical blanking interval of the input image signal, M is the number of pixel data of each frame of the input/output image signal, I is the frequency of the write clock WCLK, T is the desired extended period for the vertical blanking interval, and O is the frequency of the read clock RCLK. Further, the vertical blanking interval VBIin of the input image signal Vin added to the extended period T is equal to the vertical blanking interval VBIout of the output image signal Vout. Suppose the extended period T for the vertical blanking interval is represented in the frequency O of the read clock RCLK, Equation (1) is represented by Equation (2):

$$M/I=(N+M)/O$$

Wherein, N=T×O, where N represents the number of count within the extended period T when counting according to the read clock RCLK. With Equation (1) or Equation (2), the frequency of the read clock RCLK may be calculated in advance. The clock generator 350 then generates the read clock RCLK, which then fine tunes the read clock RCLK according to the adjustment value A to ensure that the output image signal Vout has the same frame cycle as the input image signal Vin, i.e., the output image signal Vout is synchronized with the input image signal Vin.

With description of the above embodiments, an image adjusting apparatus and an associated method provided according to the invention effectively extends vertical blanking intervals of an image signal, so that an output image signal is synchronized with an input image signal to prevent image delay.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image adjusting method, comprising:
    providing a first image signal comprising a first data enable signal and a first image data signal comprising pixel data, wherein the first data enable signal has a first data enable duration;
    storing the pixel data of the first image signal in a memory;
    generating a second data enable signal, wherein the second data enable signal has a second data enable duration;
    detecting a first reference point of the first data enable signal to generate a first detection signal, and detecting a second reference point of the second data enable signal to generate a second detection signal;
    generating an adjustment value according to the first detection signal and the second detection signal; and
    generating a read clock and adjusting the read clock according to the adjustment value;
    wherein, the second data enable signal includes a second data enable duration, the first data enable duration and second data enable duration correspond to a same image frame of the first image signal, and the second data enable duration overlaps the first data enable duration; and
    wherein, the first data enable duration indicates a position of the pixel data corresponding to the image frame in the first image data signal, and the second data enable duration indicates a position of the pixel data corresponding to the image frame in a second image data signal.

2. The image adjusting method as claimed in claim 1, wherein the second data enable duration is smaller than the first data enable duration.

3. The image adjusting method as claimed in claim 1, wherein the second data enable duration starts after the first data enable duration starts.

4. The image adjusting method as claimed in claim 1, wherein the second image data signal and the second data enable signal form a second image signal.

5. The image adjusting method as claimed in claim 4, wherein the pixel data is written into a memory during the first data enable duration.

6. The image adjusting method as claimed in claim 5, wherein the pixel data is outputted from the memory during the second data enable duration.

7. The image adjusting method as claimed in claim 1, further comprising:
    generating a control signal to a pair of three-dimensional stereo glasses according to the second data enable signal.

8. The image adjusting method as claimed in claim 1, further comprising:
    transmitting the second data enable signal to a pair of three-dimensional stereo glasses.

9. An image adjusting apparatus, for extending a vertical blanking interval of a first image signal, the first image signal comprising a first data enable signal and a first image data signal comprising pixel data of an image frame, the first data enable signal having a first data enable duration, the image adjusting apparatus comprising:
    a memory, for storing the pixel data of the first image signal; and
    a data enable signal generator, for generating a second data enable signal and controlling when the memory outputs the pixel data;
    a detector, for detecting a first reference point of the first data enable signal to generate a first detection signal, and detecting a second reference point of the second data enable signal to generate a second detection signal;
    an adjustment value generator, for generating an adjustment value according to the first detection signal and the second detection signal; and
    a clock generator for generating a read clock and adjusting the read clock according to the adjustment value;
    wherein, the second data enable signal includes a second data enable duration, the first data enable duration and the second data enable duration correspond to the image frame, and the second data enable duration overlaps the first data enable duration; and
    wherein, the first data enable duration indicates a position of the pixel data corresponding to the image frame in the first image data signal, and the second data enable duration indicates a position of the pixel data corresponding to the image frame in a second image data signal.

10. The image adjusting apparatus as claimed in claim 9, wherein the data enable signal generator generates the second data enable signal according to a predetermined time, a frame cycle, and a read clock.

11. The image adjusting apparatus as claimed in claim 9, wherein the memory receives and stores the pixel data during the first data enable duration.

12. The image adjusting apparatus as claimed in claim 9, wherein the memory outputs the pixel data during the second data enable duration.

13. The image adjusting apparatus as claimed in claim 9, wherein the second data enable signal and the pixel data outputted by the memory form a second image signal.

14. The image adjusting apparatus as claimed in claim 9, wherein the data enable signal generator generates a read signal to control when the memory outputs the pixel data.

15. The image adjusting apparatus as claimed in claim 14, wherein the read signal is the second data enable signal.

16. The image adjusting apparatus as claimed in claim 9, wherein the first reference point is a first transition edge of the first data enable signal.

17. The image adjusting apparatus as claimed in claim 9, wherein the second reference point is a second transition edge of the second data enable signal.

18. The image adjusting apparatus as claimed in claim 9, wherein the data enable signal generator further generates a control signal to a pair of three-dimensional stereo glasses.

19. The image adjusting apparatus as claimed in claim 18, wherein the control signal is the second data enable signal.

\* \* \* \* \*